Jan. 15, 1924.  
L. K. MARSHALL  
TEMPERATURE CONTROLLED APPARATUS  
Filed Feb. 4, 1922
1,481,021
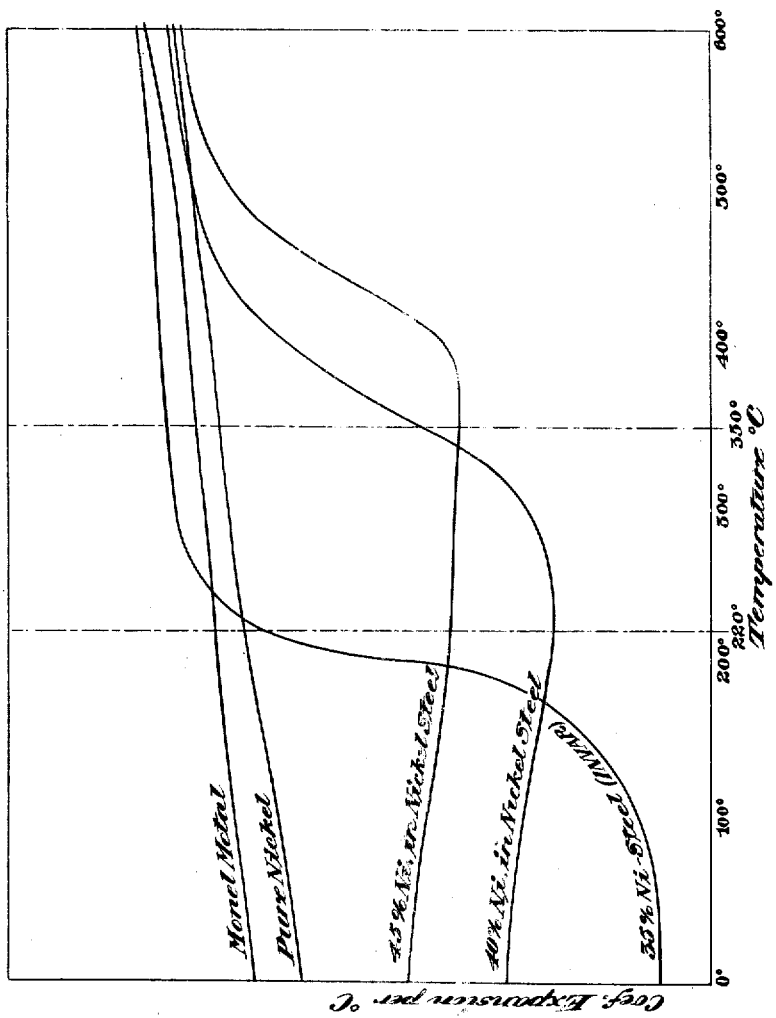

Patented Jan. 15, 1924.

1,481,021

UNITED STATES PATENT OFFICE.

LAURENCE K. MARSHALL, OF WEST SOMERVILLE, MASSACHUSETTS, ASSIGNOR TO SPENCER THERMOSTAT COMPANY, OF CAMBRIDGE, MASSACHUSETTS, A CORPORATION OF MASSACHUSETTS.

TEMPERATURE-CONTROLLED APPARATUS.

Application filed February 14, 1922. Serial No. 536,473.

*To all whom it may concern:*

Be it known that I, LAURENCE K. MARSHALL, a citizen of the United States, residing at West Somerville, in the county of Middlesex and State of Massachusetts, have invented certain new and useful Improvements in Temperature-Controlled Apparatus; and I do hereby declare the following to be a full, clear, and exact description of the invention, such as will enable others skilled in the art to which it appertains to make and use the same.

The present invention relates to temperature controlled apparatus and more particularly to thermostats embodying a plurality of metallic constituents having different coefficients of expansion.

Bimetallic strips have been employed as thermostatic controls and operate satisfactorily over a limited range of temperatures. These thermostats as heretofore developed, however, have not functioned efficiently where the range of temperature to which the thermostat was subjected exceeded a comparatively narrow range.

The object of the present invention it to produce a thermostatic control which may be subjected to a wide range of temperatures without detrimental effect and which operates efficiently at comparatively high temperatures.

With this object in view one feature of the present invention contemplates the provision of a thermostatic control consisting of a plurality of metals each having variable coefficients of expansion so chosen with respect to one another that the greatest rate of deflection on account of temperature changes occurs within the working range at which the thermostat is to act. Above and below this working range, the rates of deflection are less and may preferably be low at normal room temperatures to which the thermostat is subjected when not in operation.

Such a thermostat is particularly useful in connection with the control of electric current applied to various instrumentalities, such as flatirons, for example. In apparatus of this sort, it is desirable to have a temperature control which functions at a temperature range from 200° C. to 350° C. approximately. In the present invention the thermostat is designed in such a manner that the greatest rate of deflection occurs at this range. On the other hand, when the flatiron cools down and remains at room temperatures the deflection rate, due to the different coefficients of expansion, is materially less and is such that substantially internal stresses are not imposed upon the thermostatic couple.

A still further feature of the present invention contemplates a bimetallic strip consisting of two alloys of different metals, each alloy having a variable coefficient of expansion, the difference between the coefficients of expansion of the two alloys being greatest throughout a range of comparatively high temperatures and materially less for temperatures above and below the working range. This construction produces a thermostatic couple having its greatest sensitivity at a comparatively high temperature and least sensitivity at temperatures outside of the desired range.

The accompanying drawing illustrates diagrammatically the temperature and expansion curves of certain alloys which may be advantageously combined to produce a thermostatic couple according to the present invention.

The present invention may be embodied with special utility in a thermostatically controlled electric flatiron in which the thermostatic member employed for controlling the temperture of the flatiron comprises a bimetallic sheet or strip so designed that when predetermined limits of temperature are reached the strip abruptly changes its shape, due to the internal stresses set up therein, this abrupt change of shape being utilized to control the flow of heating current. In apparatus of this type it is desirable that the control shall function over a working range varying between 200° C. and 350° C. approximately. Although the control should have the greatest deflection rate at this approximate working range, nevertheless when the flatiron is not in use the control is at room temperature and it must accordingly be capable of withstanding the wide range of temperature between room temepratures and the working range without creating internal stresses sufficient to exceed the limits of elasticity of the metals and cause permanent deflection. Furthermore the metals comprising the thermostat must be of such a nature that they do not lose their temper when the control is heated to the comparatively high temperatures within which the working range lies.

As illustrations of certain specific forms of thermostatic members embodying the desired properties may be mentioned the combination in a bimetallic strip of pure nickel and a nickel steel alloy having forty to forty-five per cent nickel. Upon referring to the accompanying drawing it will be observed that the coefficients of expansion of these two materials are variable and differ the most throughout a temperature range of 200° C. to 350° C. approximately. Above and below this temperature range, the coefficients of expansion of the two materials are less and at temperatures between 400° C. and 500° C. the coefficients of expansion are practically the same. As examples of other combinations which may be satisfactorily employed for high temperature thermostats may be mentioned a combination of invar, which is a nickel steel having thirty-five per cent nickel approximately, and a nickel steel having forty per cent nickel; a combination of nickel steel having forty-five per cent nickel approximately and malleable nickel having ninety-six per cent nickel and four per cent manganese approximately; a combination of Monel metal consisting of copper and about two thirds nickel and a nickel steel having forty to fifty per cent nickel; and a combination of nickel silver and nickel steel having forty to fifty per cent nickel. In addition to the metals and alloys specifically enumerated, certain other metals and the alloys of these metals may well be employed in combination, depending upon the character of use to which the thermostat is to be put and the working range over which it is desired that the thermostat shall operate.

I claim:—

1. A high temperature thermostatic control composed of a combination of metallic constituents, said constituents having variable coefficients of expansion with the greatest differences in expansion over a working temperature range substantially above room temperatures and less differences in expansion at temperatures outside said range.

2. A high temperature thermostatic control composed of a plurality of different metallic constituents, said constituents being so related with respect to one another that the rate of deflection of the thermostatic member on account of temperature changes between 200° C. and 350° C. approximately is large and the rate of deflection on account of temperature changes above 400° C. is substantially less.

3. A heat-responsive device comprising metallic elements having coefficients of expansion which differ at least two to one within a range of temperatures above 250° C.

4. A heat-responsive device comprising metallic elements having coefficients of expansion which differ at least two to one within the range 200° to 350° C., the element having the lower coefficient containing a minimum of 40 per cent nickel.

5. A heat-responsive device comprising metallic elements whose coefficients of expansion have a maximum difference within the temperature range of 200° to 350° C. approximately.

6. A heat-responsive device comprising metallic elements having widely different coefficients of expansion at temperatures above 200° C., the element having the higher coefficient at such temperatures containing nickel.

7. A heat-responsive device comprising metallic elements having widely different coefficients of expansion at temperatures above 250° C., both elements containing nickel.

8. A heat-responsive device comprising metallic elements having widely different coefficients of expansion at temperatures above 200° C., both elements containing nickel and the nickel content of the element having the lower coefficient at such temperatures being at least approximately 35 per cent.

9. A heat-responsive device comprising metallic elements having widely different coefficients of expansion throughout a range of temperatures above 200° C, the above element having the higher coefficient within said range having a coefficient approximately that of nickel and the other element having a higher coefficient than invar at room temperatures.

10. A heat-responsive device comprising metallic elements having widely different coefficients of expansion throughout a range of temperatures above 200° C., the element having the lower coefficient within said range having a coefficient of the order of that of a nickel steel containing approximately 42% nickel.

11. A heat-responsive device comprising metallic elements having widely different coefficients of expansion throughout a range of temperatures above 250° C., within which range one element has a coefficient at least approximately as high as that of nickel and the other element has a coefficient approximately that of steel containing 42 per cent nickel.

12. A heat-responsive device comprising metallic elements one of which is at least approximately two-thirds nickel and the other of which is an alloy containing at least approximately forty per cent nickel.

13. A heat-responsive device comprising metallic elements one of which is at least approximately two-thirds nickel and the other of which is a steel alloy containing approximately forty to forty-five per cent nickel.

14. A heat-responsive device comprising metallic elements one of which is at least approximately two-thirds nickel and the other of which is a steel alloy containing approximately forty-two per cent nickel.

15. A heat-responsive device comprising metallic elements one of which is Monel metal and the other of which is an alloy containing at least approximately forty per cent nickel.

16. A heat-responsive device comprising metallic elements one of which is Monel metal and the other of which is a steel alloy containing approximately forty to forty-five per cent nickel.

17. A heat-responsive device comprising metallic elements one of which is Monel metal and the other of which is a steel alloy containing approximately forty-two per cent nickel.

18. A heat-responsive device comprising a nickel alloy containing approximately 42 per cent nickel and a metallic element having a widely different coefficient of expansion within the range 200 to 350° C.

19. A heat-responsive device comprising a steel alloy containing approximately 40 to 45 per cent nickel and an element having widely different coefficient of expansion at approximately 300° C.

20. A heat-responsive device comprising metallic elements having widely different coefficients of expansion at temperatures above 200° C., both elements containing nickel and the nickel content of the element having the lower coefficient at such temperatures being at least approximately 40 per cent.

LAURENCE K. MARSHALL.